United States Patent [19]

Meyer et al.

[11] Patent Number: 5,049,328
[45] Date of Patent: Sep. 17, 1991

[54] PURIFICATION, IMPREGNATION AND FOAMING OF POLYMER PARTICLES WITH CARBON DIOXIDE

[75] Inventors: Bernard H. Meyer, Newtown Square; Joseph C. Kinslow, Media, both of Pa.

[73] Assignee: Arco Chemical Technology, Inc., Wilmington, Del.

[21] Appl. No.: 546,955

[22] Filed: Jul. 2, 1990

[51] Int. Cl.$^5$ .................. B29C 67/22; C08J 9/18; C08J 9/22
[52] U.S. Cl. ................. 264/50; 264/37; 264/53; 264/DIG. 9; 521/58; 521/60; 528/483
[58] Field of Search ............ 264/28, 37, 51, 50, 264/53, DIG. 9; 521/56, 97, DIG. 917, 58, 60; 528/483, 490, 498

[56] References Cited

U.S. PATENT DOCUMENTS

| 2,023,204 | 12/1935 | Munters et al. | 154/45 |
| 2,531,665 | 11/1950 | Booth | 18/48 |
| 2,848,427 | 8/1958 | Rubens | 260/2.5 |
| 3,243,485 | 3/1966 | Griffin | 264/51 |
| 3,953,558 | 4/1976 | Hatano et al. | 264/50 |
| 4,695,621 | 9/1987 | Allada | 528/483 |
| 4,703,105 | 10/1987 | Allada | 528/483 |
| 4,911,869 | 5/1990 | Meyer et al. | 264/50 |
| 4,925,606 | 5/1990 | Francis | 264/50 |

FOREIGN PATENT DOCUMENTS

| 0183314 | 4/1986 | European Pat. Off. . |
| 0281464 | 9/1988 | European Pat. Off. . |
| 0376064 | 4/1990 | European Pat. Off. . |
| 3323940 | 1/1986 | Fed. Rep. of Germany . |
| 1332201 | 12/1963 | France . |

Primary Examiner—James Lowe
Attorney, Agent, or Firm—Lewis J. Young

[57] ABSTRACT

A process for making high-purity foam moldings without the use of organic blowing agents involves the use of inorganic gases such as carbon dioxide, nitrogen, air and other pneumatogens.

The process involves the simultaneous impregnation and purification of the polymers with or without foaming. If foaming is not done in the extractor, the polymeric particles can be foamed in pre-expanders or expanded and molded in downstream equipment.

15 Claims, No Drawings

5,049,328

PURIFICATION, IMPREGNATION AND FOAMING OF POLYMER PARTICLES WITH CARBON DIOXIDE

BACKGROUND OF THE INVENTION:

The present invention is directed to a method of impregnating and purifying polymers and copolymers with carbon dioxide or other pneumatogens.

The preparation of molded foamed plastic articles is well known wherein plastic particles are impregnated with organic blowing agents, expanded to preliminary low density particles, placed into a mold and finally expanded to the desired fully expanded article. The most used organic blowing agent is n-pentane. Unfortunately, n-pentane is now considered to be environmentally undesirable in certain geographical areas in the quantities which are removed during expansion and molding. Also, although chlorofluorocarbons are satisfactory blowing agents, these materials are undesirable because they are believed to be harmful to the earth's upper ozone layer.

To eliminate this problem, various inert blowing agents such as carbon dioxide, nitrogen, air and other pneumatogens have been tried.

U.S. Pat. No. 2,023,204 teaches to impregnate and foam polystyrene using carbon dioxide, nitrogen, sulfur hexafluoride, and the like.

U.S. Pat. No. 2,531,665 teaches to impregnate polymers at 100°–125° C. with inert gas under pressure followed by cooling and reheating in a mold to bring about expansion.

U.S. Pat. No. 2,848,427 teaches to impregnate polystyrene crosslinked with 0.01–0.25% DVB with $CO_2$ under pressure at a temperature below the Tg until at least 2% $CO_2$ was absorbed.

U.S. Pat. No. 3,243,485 teaches to impregnate films or sheets of polystyrene in dry ice.

U.S. Pat. No. 4,695,621 teaches to purify polymers with supercritical carbon dioxide.

U.S. Pat. No. 4,703,105 teaches to extract residual acrylonitrile and other low molecular weight compounds from ABS and styrene-acrylonitrile copolymers.

U.S. Pat. No. 4,911,869 teaches to mold low density foam articles by re-impregnating the expanded particles with carbon dioxide or any other pneumatogen.

U.S. Pat. No. 4,925,606 teaches to further expand extruded foam sheet by impregnating the expanded sheet with carbon dioxide.

DE 3,323,940 teaches a method of purifying poly(methacrylamide) by extracting the polymer with supercritical carbon dioxide or sulfur hexafluoride.

European Patent Application 0,183,314 teaches to purify acrylonitrile-containing copolymers by extraction of acrylonitrile, styrene, alpha-methylstyrene, and other impurities with carbon dioxide or ethylene at critical or supercritical temperature and pressure.

European Patent Application 0,281,464 teaches to purify styrene-vinylpyridine copolymers by extraction with supercritical carbon dioxide.

No one of the cited references teaches to purify, extract and impregnate the polymers in one step. Also, no one has previously taught how to combine this step with expansion and molding.

BRIEF SUMMARY OF THE INVENTION

We have now found that by combining the steps of impregnation, purification and foaming into a single process in equipment capable of recycling the carbon dioxide, or other pneumatogens, a foamed article can be produced which contains extremely low amounts of residual blowing agent and even no residual blowing agent and very little organic residues from the polymer.

DETAILED DESCRIPTION OF THE INVENTION

The process of this invention relates to the molding of foams from polymer particles containing inert gases or liquids as blowing agents.

The polymer particles suitable for the process may be polystyrene, styrene copolymers, polyphenylene oxide, polystyrene-polyphenylene oxide blends, polyoxymethylene, polymethyl methacrylate, methyl methacrylate copolymers, polyethylene, polypropylene, ethylene-propylene copolymers, polyvinyl chloride, cross-linked variations thereof, rubber-modified variations thereof and interpenetrating networks thereof. Any polymer or combination of polymers that absorb 2-20% of inert blowing agent or extraction fluid would be suitable for this process. Particularly suitable copolymers of styrene are those copolymers with from 5 to 35 mole percent of maleic anhydride and its derivatives such as the imide, N-alkylimide, N-phenylimide, esters, half acids and half esters. Other suitable copolymers are styrene-acrylonitrile, acrylonitrile-butadiene-styrene, styrene-methyl methacrylate, styrene-methacrylic acid, styrene-acrylic acid and the rubber modified high impact styrene copolymers.

The inert blowing agents may be gas or liquid carbon dioxide, nitrogen, air and other pneumatogens. As is known, when these agents are used as blowing agents for the named polymers, the agent escapes exceedingly fast from the polymer particles at room temperature and atmospheric pressure. It is therefore necessary to impregnate and extract the particles in pressure equipment capable of containing supercritical fluids, high pressure gases or pressurized and/or chilled liquids. The critical temperature and pressure for carbon dioxide are 31° C. and 73 bars respectively.

In the process of the invention, the polymer particles are placed in a pressure vessel, and extracted and impregnated with fluids at liquid or supercritical conditions. The extracts are then removed from the circulating fluids in a recovery chamber where the fluid is vented to a condenser and returned to the pressure vessel. The purified, impregnated polymer is then heated to pre-expand the polymer. The expanded polymer can then be injected into a mold and foamed. If necessary, the pre-expanded polymer can be reimpregnated with inert fluids before being molded and foamed. The product is an extremely pure polymer article, compared to products molded by the ordinary process. Especially in the case where carbon dioxide is the extracting fluid and the blowing agent, the product has no residual blowing agent, minimal residual organic impurities from the polymer, and is, therefore, exceptionally useful in food containers and in drinking cups.

The use of these purifying fluids eliminates the objections encountered when the organic hydrocarbon blowing agents are used in certain geographic areas. Thus, no toxic fumes are given off during the molding cycles. Further, there are no residual vapors given off by the moldings after removal from the mold. Although not completely satisfactory, combinations of hydrocarbon and $CO_2$ may also be used.

The following examples are meant to further illustrate the invention, but not to limit the claims.

EXAMPLE I

Two hundred fourteen grams of polystyrene beads (0.4 mm diameter) were placed in an extractor-impregnator capable of withstanding pressures of supercritical carbon dioxide at temperatures of at least 50° C. Carbon dioxide was continuously added at the desired temperature and pressure for the desired times. The carbon dioxide containing the extracted material was separated from the material and vented to the air, although it could have been reclaimed and recycled to the extractor-impregnator. The polystyrene was analyzed before and after extraction for volatile organic compounds.

The results are shown in Table I.

TABLE I

| Purification of Polystyrene Beads with Supercritical $CO_2$ | | | |
|---|---|---|---|
| Residual Low Molecular Weight Organic Compound | Residual Low MW Compound before Purification (ppm) | Residual Low MW Cpd. (ppm) after purification with | |
| | | Liquid $CO_2$ | Supercritical $CO_2$ |
| A | 20 | 16 | <1 |
| B | 7 | <5 | <1 |
| C | 125 | 90 | <1 |
| D | 10 | 18 | <1 |
| E | 17 | 27 | <1 |
| F | 546 | 372 | <1 |
| G | 265 | 289 | <1 |

Liquid $CO_2$ conditions: 1160 psig, room temperature, 135 min.
Supercritical $CO_2$ conditions: 4335 psig, 50° C., 324 min.
The $CO_2$ content of the beads was 8.2% following extraction with liquid $CO_2$, and 4–12% following extraction with supercritical $CO_2$.

Beads containing similar levels of carbon dioxide were expanded in a steam autoclave (20 psig external and 25 psig internal) for 5–10 sec. The resultant puff had a density of 6–7 pcf.

The pre-puff from the above were molded into cups after varying times in dry ice. The fusion of the molded articles were rated and recorded in Table II.

TABLE II

| Treatment | Fusion |
|---|---|
| None | Poor |
| 1 Day in dry ice | Good |
| 1 Day in air (30 psig) | Good |

It can be seen from the data in Table II that when the beads were pre-puffed, the $CO_2$ was completely dissipated and the moldings were not fused. Reimpregnation of the pre-expanded beads allowed the reimpregnated beads to be molded into parts having reasonable fusion of the beads. The use of air instead of dry ice for the reimpregnation is also illustrated.

EXAMPLE II

Other polymers were similarly impregnated with or without extraction using carbon dioxide (4–12 wt-% $CO_2$). These products were expanded in appropriate fluids (i.e. steam, hot glycerine, etc.) and molded after re-impregnation in air (30–300 psig, 2–70 hrs.). Foam densities of these products are shown in Table III.

TABLE III

| Polymer | Density, pcf. |
|---|---|
| Polystyrene #1 | 3.0 |
| Polystyrene #2 | 2.0 |
| Polystyrene #3 | 6.0 |
| X-linked polystyrene | 6.0 |
| Modified polystyrene | 1.8 |
| Plasticized polystyrene | 1.6 |
| Styrene/maleic anhydride cop. | 5.0 |
| Styrene/acrylonitrile cop. | 5.3 |

We claim:

1. A process for foaming polymers and copolymers, comprising the steps of
   (a) placing the desired polymer or copolymer particles in a pressure vessel extractor-impregnator;
   (b) continuously extracting the polymer particles with a fluid at liquid or supercritical conditions to remove low molecular weight compounds while impregnating the polymer particles with the extracting fluid;
   (c) separating the purified, impregnated polymer particles from the extractor-impregnator;
   (d) pre-expanding the purified, impregnated particles at a temperature above the glass transition temperature of the polymer-fluid blend; and
   (e) molding the expanded particles by heating in a foam molding machine.

2. The process of claim 1 wherein the polymer is polystyrene.

3. The process of claim 1, wherein the copolymer is a copolymer of styrene and 5 to 35 mole-% of maleic anhydride, maleimide, N-alkylmaleimide, N-phenylmaleimide, esters and half esters of maleic acid, and mixtures thereof.

4. The process of claim 1 wherein the reimpregnation is accomplished with a mixture of carbon dioxide and a minor amount of a hydrocarbon blowing agent, with or without halogen substituents.

5. The process of claim 1 wherein the polymer is a blend of two or more polymers.

6. The process of claim 1 wherein the mixture of extracting fluid and low molecular weight compounds is continuously removed from the extractor-impregnator to a recovery chamber wherein the mixture is vented to a condenser to separate the extracting fluid from the low molecular weight compounds, and wherein the resulting purified extracting fluid is then continuously returned to the extractor-impregnator.

7. The process of claim 1 wherein the purified, expanded particles are reimpregnated with gaseous, liquid, or solid carbon dioxide, air, nitrogen, or other pneumatogens prior to molding the particles.

8. The process of claim 1 wherein the polymer is copolymer is selected from the group consisting of polystyrene, styrene-acrylonitrile, acrylonitrile-butadiene-styrene, styrene-maleic anhydride, styrene-methyl methacrylate, styrene-methacrylic acid, styrene-acrylic acid, high-impact rubber-modified styrene copolymers, poly(methyl methacrylate), methyl methacrylate copolymers, poly(vinyl chloride), poly(oxymethylene), poly(phenylene oxide), polypropylene, polyethylene, ethylene-propylene copolymers, polystyrene-poly(phenylene oxide) blends, cross-linked variations thereof, rubber-modified variations thereof, and interpenetrating networks thereof.

9. A process for foaming polymers and copolymers, comprising the steps of (a) placing the desired polymer or copolymer particles in a pressure vessel extractor-impregnator;

(b) continuously extracting the polymer particles with carbon dioxide at liquid or supercritical conditions to remove low molecular weight compounds while impregnating the polymer particles with the carbon dioxide, wherein the mixture of carbon dioxide and low molecular weight compounds is continuously removed from the extractor-impregnator to a recovery chamber wherein the mixture is vented to a condenser to separate the carbon dioxide from the low molecular weight compounds, and wherein the resulting purified carbon dioxide is then continuously returned to the extractor-impregnator;

(c) separating the purified, impregnated polymer particles from the extractor-impregnator;

(d) pre-expanding the purified, impregnated particles at a temperature above the glass transition temperature of the polymer-carbon dioxide blend;

(e) reimpregnating the expanded particles in gas, liquid, or solid carbon dioxide, air, nitrogen, or other pneumatogens, and (f) molding said reimpregnated expanded particles by heating in a foam molding machine.

10. The process of claim 9 wherein the polymer is polystyrene.

11. The process of claim 9 wherein the copolymer is a copolymer of styrene and 5 to 35 mole-% of maleic anhydride, maleimide, N-alkylmaleimide, N-phenylmaleimide, esters and half esters of maleic acid, and mixtures thereof.

12. The process of claim 9 wherein the polymer is a blend of two or more polymers.

13. The process of claim 9 wherein the reimpregnation is accomplished with a mixture of carbon dioxide and a minor amount of a hydrocarbon blowing agent, with or without halogen substituents.

14. The process of claim 9 wherein the polymer or copolymer is selected from the group consisting of polystyrene, styrene-acrylonitrile, acrylonitrile-butadiene-styrene, styrene-maleic anhydride, styrene-methyl methacrylate, styrene-methacrylic acid, styrene-acrylic acid, high-impact rubber-modified styrene copolymers, poly(methyl methacrylate), methyl methacrylate copolymers, poly(vinyl chloride), poly(oxymethylene, poly(phenylene oxide), polypropylene, polyethylene, ethylene-propylene copolymers, polystyrene-poly(phenylene oxide) blends, cross-linked variations thereof, rubber-modified variations thereof, and interpenetrating networks thereof.

15. A process for making foamed, molded polystyrene, comprising the steps of:

(a) placing expandable polystyrene beads in a pressure vessel extractor-impregnator;

(b) continuously extracting the beads with carbon dioxide at supercritical conditions to remove low molecular weight compounds while impregnating the beads with carbon dioxide, wherein the mixture of carbon dioxide and low molecular weight compounds is continuously removed from the extractor-impregnator to a recovery chamber wherein the mixture is vented to a condenser to separate the carbon dioxide from the low molecular weight compounds, and wherein the resulting purified carbon dioxide is then continuously returned to the extractor-impregnator;

(c) separating the purified; impregnated polystyrene beads from the extractor-impregnator;

(d) pre-expanding the beads at a temperature above the glass transition temperature of the polystyrene-carbon dioxide blend;

(e) reimpregnating the expanded beads in gaseous, liquid, or solid carbon dioxide, air, nitrogen, or other pneumatogens; and (f) molding said reimpregnated, expanded beads by heating in a foam molding machine.

* * * * *